United States Patent
Choi et al.

(10) Patent No.: US 12,471,851 B2
(45) Date of Patent: Nov. 18, 2025

(54) METHOD AND SYSTEM FOR PROVIDING CANCER DIAGNOSIS INFORMATION USING ARTIFICIAL INTELLIGENCE-BASED LIQUID BIOPSY OF EXOSOME

(71) Applicant: Exopert Corporation, Seoul (KR)

(72) Inventors: Yeon Ho Choi, Seoul (KR); Hyun Ku Shin, Seoul (KR); Jae Na Park, Seongnam-si (KR); Soon Woo Hong, Seoul (KR)

(73) Assignee: Exopert Corporation, Seoul (KR)

( * ) Notice: Subject to any disclaimer, the term of this patent is extended or adjusted under 35 U.S.C. 154(b) by 1199 days.

(21) Appl. No.: 17/311,718

(22) PCT Filed: Jan. 13, 2020

(86) PCT No.: PCT/KR2020/000568
§ 371 (c)(1),
(2) Date: Jun. 8, 2021

(87) PCT Pub. No.: WO2020/180003
PCT Pub. Date: Sep. 10, 2020

(65) Prior Publication Data
US 2022/0022816 A1    Jan. 27, 2022

(30) Foreign Application Priority Data
Mar. 4, 2019    (KR) .................. 10-2019-0024870

(51) Int. Cl.
| | | |
|---|---|---|
| *G01N 33/48* | (2006.01) | |
| *A61B 5/00* | (2006.01) | |
| *A61B 5/1455* | (2006.01) | |
| *G01N 21/65* | (2006.01) | |
| *G06N 3/08* | (2023.01) | |
| *G16H 50/20* | (2018.01) | |

(52) U.S. Cl.
CPC .......... *A61B 5/7264* (2013.01); *A61B 5/0059* (2013.01); *A61B 5/1455* (2013.01); *G01N 21/658* (2013.01); *G06N 3/08* (2013.01); *G16H 50/20* (2018.01)

(58) Field of Classification Search
None
See application file for complete search history.

(56) References Cited

U.S. PATENT DOCUMENTS

| | | |
|---|---|---|
| 8,013,991 B2 | 9/2011 | Maier et al. |
| 2017/0252466 A1 | 9/2017 | Peyman |
| 2018/0075343 A1 | 3/2018 | van den Oord et al. |
| 2018/0372730 A1 | 12/2018 | Braeckmans et al. |

FOREIGN PATENT DOCUMENTS

| | | |
|---|---|---|
| KR | 10-2018-0010280 A | 1/2018 |
| KR | 10-1925603 B1 | 2/2019 |

OTHER PUBLICATIONS

Park, Jaena, et al. "Exosome classification by pattern analysis of surface-enhanced Raman spectroscopy data for lung cancer diagnosis." Analytical chemistry 89.12 (2017): 6695-6701.*
Zong, Shenfei, et al. "Facile detection of tumor-derived exosomes using magnetic nanobeads and SERS nanoprobes." Analytical Methods 8.25 (2016): 5001-5008.*
Wang, Zhile, et al. "Screening and multiple detection of cancer exosomes using an SERS-based method." Nanoscale 10.19 (2018): 9053-9062.*
Jermyn, Michael, et al. "Neural networks improve brain cancer detection with Raman spectroscopy in the presence of operating room light artifacts." Journal of biomedical optics 21.9 (2016): 094002-094002., (7 pages).
Jermyn, Michael, et al. "A review of Raman spectroscopy advances with an emphasis on clinical translation challenges in oncology." Physics in Medicine & Biology 61.23 (2016): R370., (31 pages).
Liu, Jinchao, et al. "Deep convolutional neural networks for Raman spectrum recognition: a unified solution." Analyst 142.21 (2017): 4067-4074.
Weng, Sheng, et al. "Combining deep learning and coherent anti-Stokes Raman scattering imaging for automated differential diagnosis of lung cancer." Journal of biomedical optics 22.10 (2017): 106017-106017.
Banaei, Nariman, et al. "Machine learning algorithms enhance the specificity of cancer biomarker detection using SERS-based immunoassays in microfluidic chips." RSC advances 9.4 (2019): 1859-1868.
He, Kaiming, et al., "Deep Residual Learning for Image Recognition," *Proceedings of the IEEE conference on computer vision and pattern recognition,* 2016 (pp. 1-9).
International Search Report issued on May 28, 2020 in counterpart International Patent Application No. PCT/KR2020/000568 (3 pages in English and 3 pages in Korean).
Written Opinion issued on May 28, 2020 in counterpart International Patent Application No. PCT/KR2020/000568 (4 pages in Korean).

\* cited by examiner

*Primary Examiner* — Anna Skibinsky
(74) *Attorney, Agent, or Firm* — NSIP Law

(57) ABSTRACT

A method for providing cancer diagnosis information using artificial intelligence-based liquid biopsy of exosome according to an embodiment of the present disclosure includes measuring a cultured cell exosome Surface Enhanced Raman Spectroscopy (SERS) signal, training a deep learning model through the cultured cell exosome SERS signal, measuring a blood exosome SERS signal, analyzing the blood exosome SERS signal through the deep learning model trained with the cultured cell exosome SERS signal, and analyzing a similarity between blood exosome data and cultured cell exosome data analyzed through the deep learning model.

6 Claims, 13 Drawing Sheets

METHOD AND SYSTEM FOR PROVIDING CANCER DIAGNOSIS INFORMATION USING ARTIFICIAL INTELLIGENCE-BASED LIQUID BIOPSY OF EXOSOME

CROSS REFERENCE TO RELATED APPLICATIONS

This application is a U.S. National Stage Application of International Application No. PCT/KR2020/000568, filed on Jan. 13, 2020, which claims the benefit under 35 USC 119(a) and 365(b) of Korean Patent Application No. 10-2019-0024870, filed on Mar. 4, 2019, in the Korean Intellectual Property Office, the entire disclosure of which is incorporated herein by reference for all purposes.

TECHNICAL FIELD

The present disclosure relates to a method and system for providing cancer diagnosis information using artificial intelligence-based liquid biopsy of exosome.

BACKGROUND ART

Exosomes are extracellular vesicles that are rich in body fluids such as blood, urine and saliva, and are materials that are secreted from all cells and involved in a variety of biological mechanisms such as interaction between cells and metastasis. The exosomes are 30-200 nm in size and produced by forming multivesicular bodies intracellularly by endocytosis, which are released by exocytosis, and include materials representative of the characteristics of parent cells such as protein and miRNA. Accordingly, the exosomes containing the characteristics of disease cells are present in body fluids, and may be used as biomarkers for cancer diagnosis based on these characteristics.

Meanwhile, when a molecule is illuminated with light, inelastic scattering that may exhibit the characteristics of vibrational modes of bonds occurs in the molecule, and it is called Raman scattering. Since the vibrational modes of the molecule appear according to the characteristics of bonds in the molecule, a Raman scattered light signal found in the molecule may be used as fingerprint information of the molecule. However, its disadvantage is signal sensitivity that is so low that the frequency of Raman scattering is one in every million photons.

Surface Enhanced Raman Spectroscopy (SERS) is a method designed to solve the low signal intensity problem of normal Raman Spectroscopy, and may amplify a Raman signal of the molecule about $10^7$-$10^8$ times or more based on a strong electromagnetic field in a nanogap between plasmonic nanostructures. Technically, it is said that this method achieves single molecule-level detection at the femtomolar concentration levels of molecules.

As described above, since the exosomes contain a lot of information of parent cells, attention is focused on the use as biomarkers for liquid biopsy in the diagnostic medical field. Studies have been made to detect information of disease exosomes in body fluids and early diagnose or monitor the diseases by applying a variety of biological material detection technologies. In particular, it is predicted to solve the problems of the existing cancer diagnosis techniques such as invasive diagnosis, high false positive risks and exposure to very high levels of radiation through the exosome based liquid biopsy technique.

SERS is a technique that can acquire Raman spectroscopy signals found on the surface of exosomes with ultrahigh sensitivity, and thus is effective in detecting the characteristics of exosomes specific to diseases. Additionally, since SERS is a label-free detection technique, a preprocessing process for capturing only a targeted marker may be omitted and high signal sensitivity is achieved even in a low concentration sample.

However, the SERS signals of exosomes detect heterogeneous signals and are complex signals due to heterogeneous materials between individual exosomes, interaction with plasmonic nanoparticles which are probes and material distributions of attached surfaces.

To overcome these limitations, methods such as principal component analysis (PCA) and partial least-squares discriminant analysis (PLS-DA) have been applied, but it is difficult to analyze cancer exosomes in patients' body fluids since they are present together with exosomes derived from normal cells.

DISCLOSURE

Technical Problem

There is a need for an approach to provide cancer diagnosis information more accurately using Surface Enhanced Raman Spectroscopy (SERS) signals of exosomes in the technical field.

Technical Solution

To solve the above-described technical problem, an embodiment of the present disclosure provides a method for providing cancer diagnosis information using artificial intelligence-based liquid biopsy of exosome.

The method for providing cancer diagnosis information using artificial intelligence-based liquid biopsy of exosome includes measuring a cultured cell exosome Surface Enhanced Raman Spectroscopy (SERS) signal, training a deep learning model through the cultured cell exosome SERS signal, measuring a blood exosome SERS signal, analyzing the blood exosome SERS signal through the deep learning model trained with the cultured cell exosome SERS signal, and analyzing a similarity between blood exosome data and cultured cell exosome data analyzed through the deep learning model.

In addition, another embodiment of the present disclosure provides a system for providing cancer diagnosis information using artificial intelligence-based liquid biopsy of exosome.

The system for providing cancer diagnosis information using artificial intelligence-based liquid biopsy of exosome includes a training data input unit to receive input of a cultured cell exosome SERS signal used to train a deep learning model, a patient data input unit to receive input of a patient's blood exosome SERS signal data, the deep learning model trained using the cultured cell exosome SERS signal inputted through the training data input unit to analyze the blood exosome SERS signal data inputted through the patient data input unit, and a similarity analysis unit to analyze a similarity between blood exosome data and cultured cell exosome data analyzed through the deep learning model.

Furthermore, the above-described technical solution does not enumerate all the features of the present disclosure. A variety of features of the present disclosure and their advantages and effects will be understood in more detail with reference to the following specific embodiments.

Advantageous Effects

According to an embodiment of the present disclosure, it is possible to overcome the limitation of signal heterogeneity through analysis of complex Surface Enhanced Raman Spectroscopy (SERS) signals of exosomes via artificial intelligence. Through this, it is possible to achieve noninvasive cancer liquid biopsy using exosomes. Additionally, it is possible to diagnose cancer using only blood without risk of exposure to radiation such as X-ray and Computer Tomography (CT) or invasive tissue biopsy, and in addition to cancer diagnosis, to monitor patients' treatment.

BEST MODE

Hereinafter, the preferred embodiments will be described in sufficiently detail for those skilled in the art to easily practice the invention with reference to the accompanying drawings. However, in describing the preferred embodiments of the present disclosure in detail, when a certain detailed description of relevant known functions or elements is deemed as rendering the subject matter of the present disclosure unnecessarily ambiguous, the detailed description is omitted herein. Additionally, elements with similar functions and operations use the same signs throughout the drawings.

Additionally, in the specification, when an element is referred to as being 'connected to' another element, the element may be 'directly connected to' the other element and the element may be 'indirectly connected to' the other element with intervening elements between them. Additionally, the term 'comprises' when used in this specification, specifies the presence of stated elements, does not preclude the presence or addition of one or more other elements unless the context clearly indicates otherwise.

Figure 1:
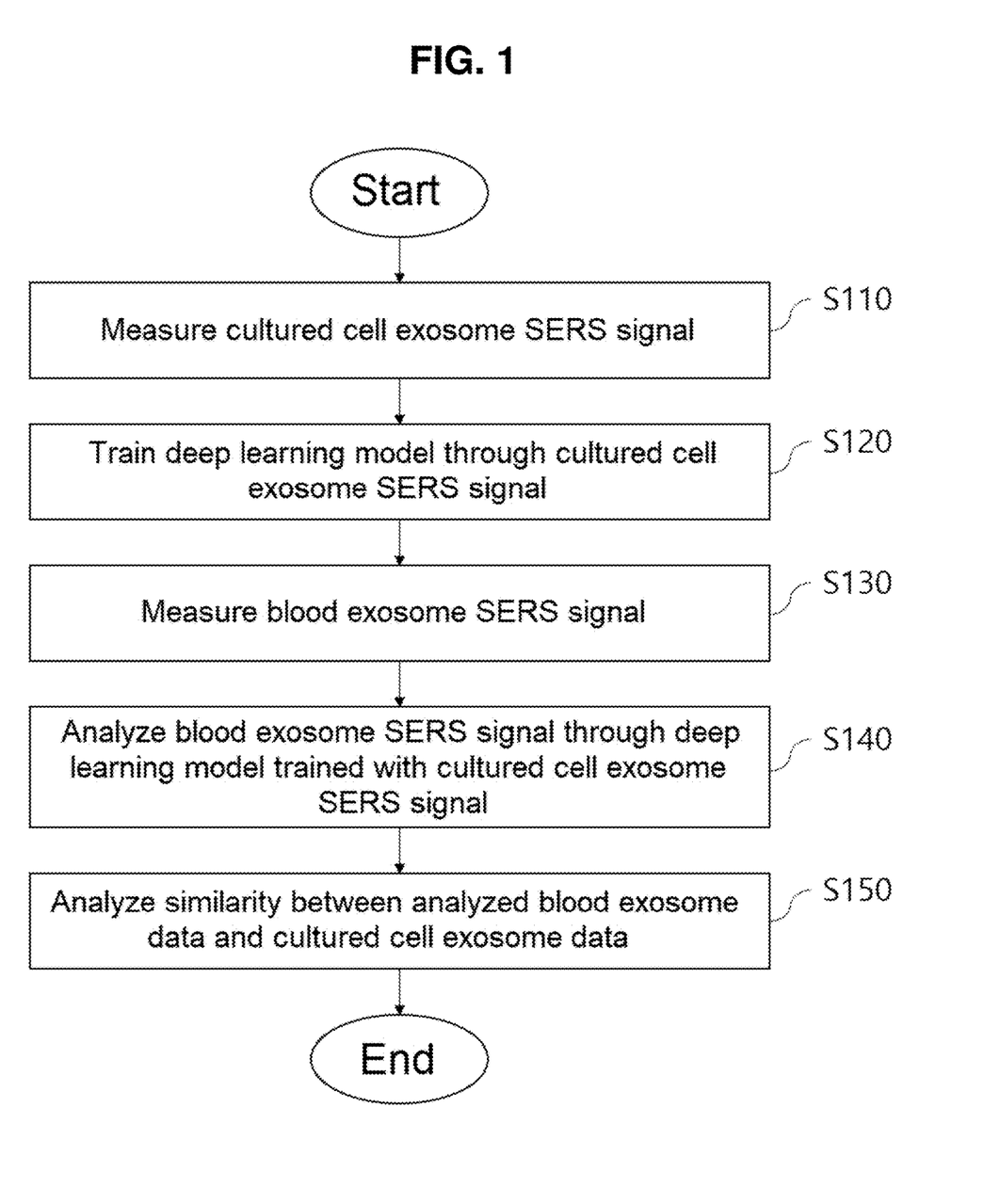
FIG. 1 is a flowchart of a method for providing cancer diagnosis information using artificial intelligence-based liquid biopsy of exosome according to an embodiment of the present disclosure.

FIG. 1 is a flowchart of a method for providing cancer diagnosis information using artificial intelligence-based liquid biopsy of exosome according to an embodiment of the present disclosure.

Referring to FIG. 1, the method for providing cancer diagnosis information using artificial intelligence-based liquid biopsy of exosome according to an embodiment of the present disclosure may include the steps of (S110) measuring cultured cell exosome Surface Enhanced Raman Spectroscopy (SERS) signals, (S120) training a deep learning model through the cultured cell exosome SERS signals, (S130) measuring blood exosome SERS signals, (S140) analyzing the blood exosome SERS signals through the deep learning model trained with the cultured cell exosome SERS signals, and (S150) analyzing a similarity between the blood exosome data and cultured cell exosome data analyzed through the deep learning model.

First, in the step of measuring the cultured cell exosome SERS signals (S110), SERS signals of exosomes derived from cultured cells may be measured. Here, the cultured cells may include cultured normal cells and cancer cells.

According to an embodiment, an agglomerated structure of 80 nm spherical gold nanoparticles using salts may be used to measure the SERS signals of exosomes. Here, the corresponding structure may be formed by spraying concentrated gold nanoparticles onto a washed cover glass, adding a $CuSO_4$ based salt solution to cause gold nanoparticles to agglomerate, and drying. The SERS signals may be measured after applying an exosome solution with a concentration of $10^7$ to $10^9$ particles/mL to the manufactured substrate and completely drying.

In the step of training the deep learning model through the cultured cell exosome SERS signals (S120), the deep learning model may be trained using the measured cultured cell exosome SERS signals, i.e., SERS signals of normal cell exosomes and SERS signals of cancer cell exosomes derived from cultured normal cells and cancer cells, respectively.

According to an embodiment, an applied model of ResNet model may be used as the deep learning model.

Figure 2:
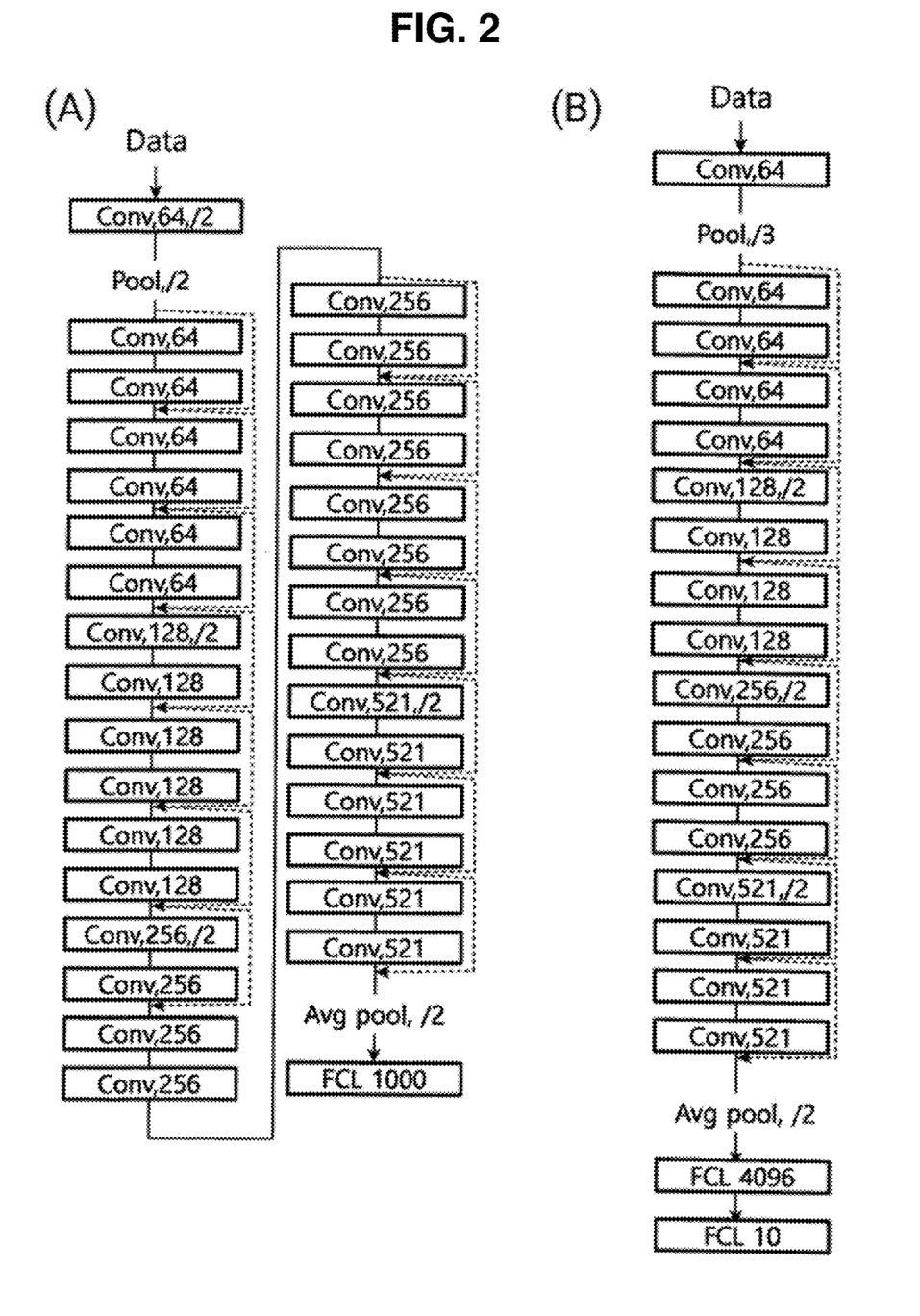
FIG. 2 is a diagram for describing a deep learning model according to an embodiment of the present disclosure.

FIG. 2 is a diagram for describing the deep learning model according to an embodiment of the present disclosure, (A) of FIG. 2 shows the ResNet model, and (B) shows the applied model of the ResNet model according to an embodiment of the present disclosure.

The ResNet model shown in (A) of FIG. 2 was proposed in 2015 (He, Kaiming, et al. "Deep residual learning for image recognition." Proceedings of the IEEE conference on computer vision and pattern recognition. 2016), and basically, was developed for 2-dimensional image analysis.

According to an embodiment of the present disclosure, the ResNet model shown in (A) of FIG. 2 is adapted as shown in (B) of FIG. 2 and used to analyze SERS signal data which is 1-dimensional data.

Describing in detail, the ResNet model shown in (A) of FIG. 2 is a 34-layer ResNet model and includes a first convolutional layer conv. 64, /2 where data is inputted, a plurality of second convolutional layers conv. 64, a plurality of third convolutional layers conv. 128, a plurality of fourth convolutional layers conv. 256 and a plurality of fifth convolutional layers conv. 512 connected to the first convolutional layer in that order, and a fully connected layer (FCL), and the second to fifth convolutional layers are configured to perform residual learning by adding skip connection every two convolutional layers.

In contrast, the deep learning model according to an embodiment of the present disclosure as shown in (B) of FIG. 2 has a simple convolutional layer configuration, and includes a first convolutional layer conv. 64 where data is inputted, 4 second convolutional layers conv. 64, 4 third convolutional layers conv. 128, 4 fourth convolutional layers conv. 256 and 4 fifth convolutional layers conv. 512 connected to the first convolutional layer in that order, and 2 fully connected layers FCL 4096, FCL 10, and the second to fifth convolutional layers add skip connection every two convolutional layers. Here, the number of convolutional layers included in the second to fifth convolutional layers is not limited thereto and may change where necessary. Additionally, the fully connected layer (FCL) located at the end of the deep learning model includes a first fully connected layer FCL 4096 having 4096 values, and a second fully connected layer FCL 10 connected to the output end of the first fully connected layer and having 10 values, and finally, may classify data into normal exosome and lung cancer exosome.

The following embodiment preprocesses SERS signal data through, for example, min-max normalization before training the deep learning model, and uses Raman spectrum in the range of 475 to 2000 cm$^{-1}$ as data.

As described above, an embodiment of the present disclosure may train the deep learning model using SERS signals of exosomes in cultured cells, i.e., normal cells and cancer cells, thereby classifying the characteristics of the normal cells and the cancer cells more accurately.

In the step of measuring the blood exosome SERS signals (S130), SERS signals of exosomes in the patient's blood may be measured. In this case, blood exosome SERS signals may be measured by the same process as described above in the step of measuring the cultured cell exosome SERS signals (S110), and its repetitive description is omitted herein.

In the step of analyzing the blood exosome SERS signals through the deep learning model trained with the cultured cell exosome SERS signals (S140), blood exosome SERS signals may be analyzed using the deep learning model trained in the above-described step S120.

Since the exosomes in the patient's blood include normal cell derived exosomes and cancer cell derived exosomes together, it is difficult to classify them by binary classification like as classifying cultured cell exosomes.

Accordingly, according to an embodiment of the present disclosure, it proposes making use of information of the second fully connected layer FCL 10 that is an immediately previous layer, not the final binary output layer, as described below.

Figure 3:
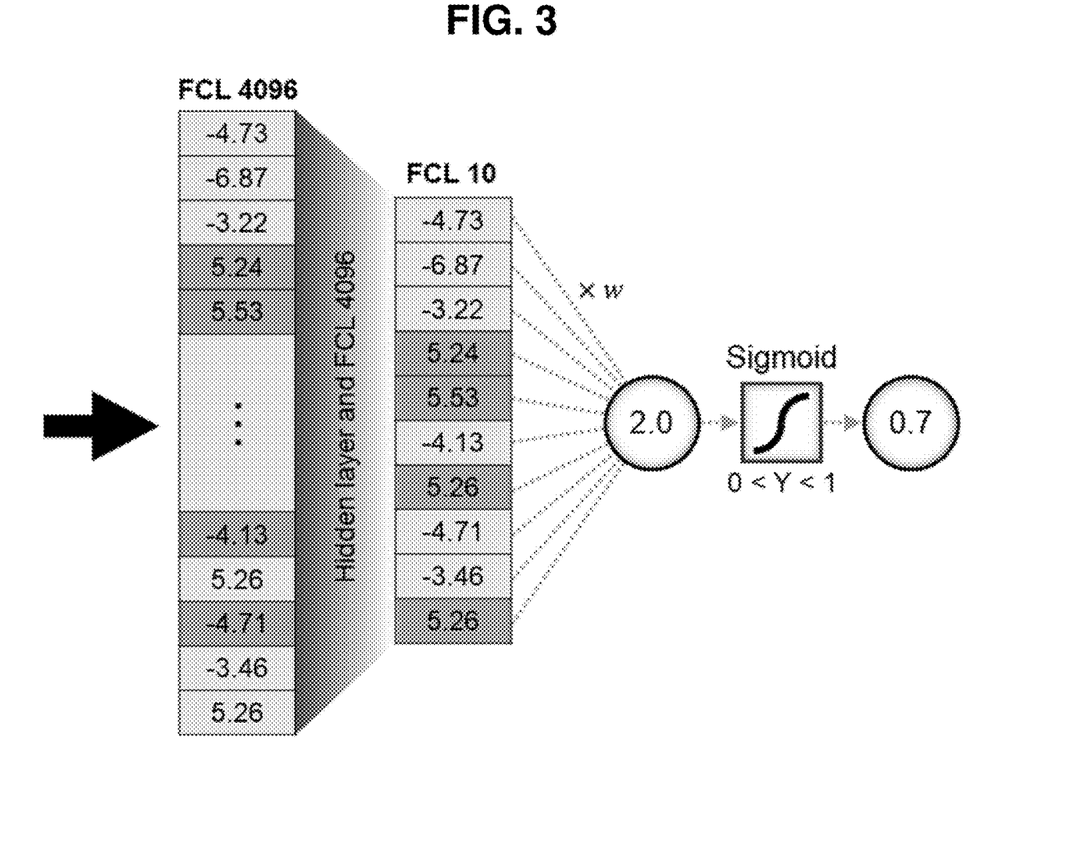
FIG. 3 is a diagram for describing a data analysis step according to an embodiment of the present disclosure.

FIG. 3 is a diagram for describing the data analysis step according to an embodiment of the present disclosure.

As shown in FIG. 3, the FCL 10 has 10 numerical values as values derived through all the previous layers, and when the blood exosome SERS signals are classified using the trained deep learning model, 10 values may be derived from FCL 10.

In the step of analyzing the similarity between the analyzed blood exosome data and the cultured cell exosome data (S150), analysis may be conducted to determine whether exosome data in the patient's blood is similar to normal cell exosome data or cancer cell exosome data, by comparing FCL 10 values derived by classifying the blood exosome SERS signals with FCL 10 values derived by classifying SERS signals of exosomes in cultured cells, i.e., normal cells and cancer cells respectively.

Figure 4:
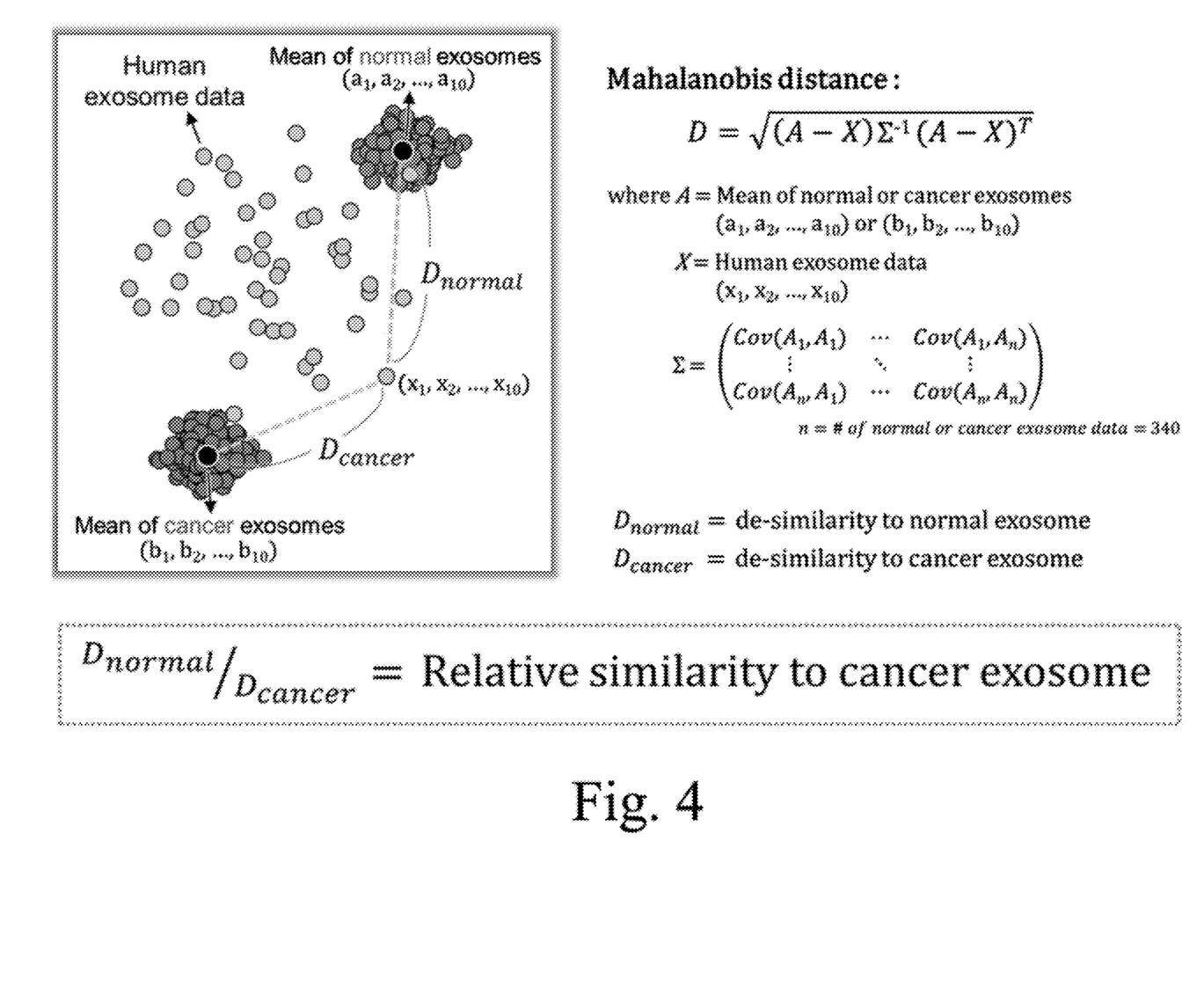
FIG. 4 is a diagram for describing a similarity analysis step according to an embodiment of the present disclosure.

FIG. 4 is a diagram for describing the similarity analysis step according to an embodiment of the present disclosure, and for convenience, showing 10 values derived from the FCL 10 on 2-dimensions.

According to an embodiment, the similarity between blood exosome data and cultured cell exosome data may be calculated through Mahalanobis distance. However, the similarity calculation method according to the present disclosure is not limited thereto, and a variety of methods for quantitating similarities between data may be applied.

In detail, in the picture shown on the left side of FIG. 4, when Mahalanobis distances between blood exosome data (Human exosome data) and normal cell exosome data (Mean of normal exosomes), and between blood exosome data (Human exosome data) and cancer cell exosome data (Mean of cancer exosomes) are calculated, the calculated Mahalanobis distances may indicate de-similarity between each data. Here, a method of calculating the Mahalanobis distance is well known to those skilled in the art, and its detailed description is omitted herein.

According to an embodiment of the present disclosure, a relative similarity to cancer exosome, i.e., a relative similarity of blood exosome data to cancer cell exosome data may be calculated by the following equation.

Relative similarity to cancer exosome=Mahalanobis distance $D_{normal}$ of blood exosome data from normal cell exosome data/Mahalanobis distance $D_{cancer}$ of blood exosome data from cancer cell exosome data Accordingly, according to an embodiment of the present disclosure, the relative similarity of blood exosome data to cancer cell exosome data derived through the above-described process may be used to diagnose cancers.

Hereinafter, the present disclosure is described based on an embodiment applied to lung cancer patients. However, the present disclosure is not necessarily limited thereto, and in addition to lung cancer, may be equally to patients with, for example, pancreatic cancer, breast cancer and blood cancer.

Figure 5:
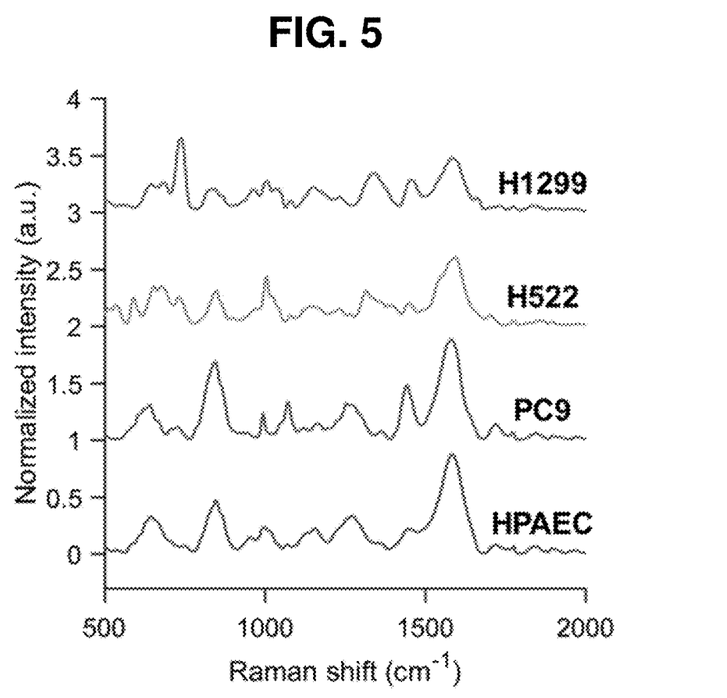
FIG. 5 is a diagram showing normal cell and lung cancer cell exosome Raman signals acquired according to an embodiment of the present disclosure.

FIG. 5 is a diagram showing normal cell and lung cancer cell exosome Raman signals acquired according to an embodiment of the present disclosure, showing 340 SERS signals of exosomes derived from each of normal lung cells (human pulmonary alveolar epithelial cells (HPAEC)) and 3 types of lung cancer cells (PC9, H522, H1299).

Figure 6:
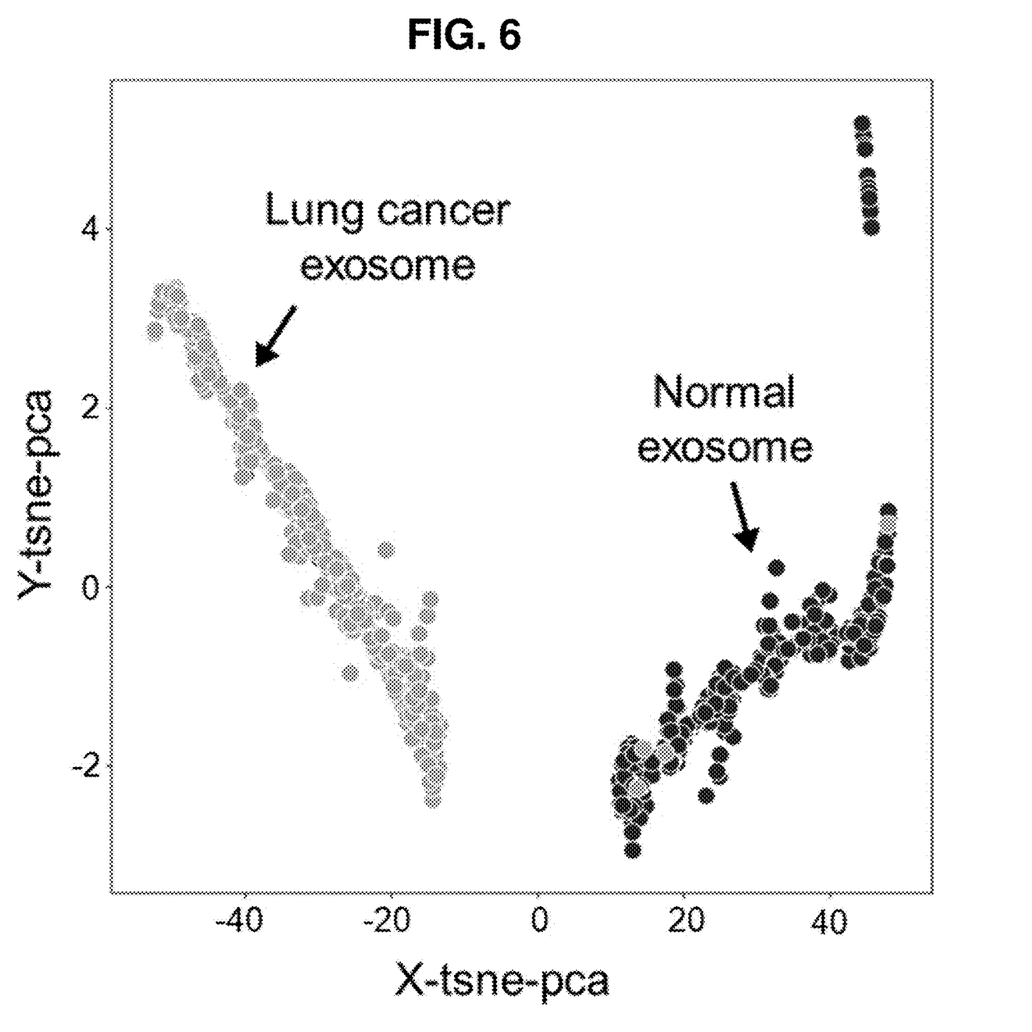
FIG. 6 is a diagram showing a result of classifying normal cell and lung cancer cell exosome Raman signals through a deep learning model according to an embodiment of the present disclosure.

FIG. 6 is a diagram showing a result of classifying normal cell and lung cancer cell exosome Raman signals through the deep learning model according to an embodiment of the present disclosure.

When normal cell and lung cancer cell exosome Raman signals are classified through the deep learning model according to an embodiment of the present disclosure, it can be seen that normal exosomes and lung cancer exosomes are classified as shown in FIG. 6.

The following Table 1 shows a result of validating the deep learning model according to an embodiment of the present disclosure through 10-CV (10 cross validation).

TABLE 1

| CV | Train accuracy(%) | Test accuracy(%) |
|---|---|---|
| 1 | 95 | 64 |
| 2 | 98 | 83 |
| 3 | 98 | 85 |
| 4 | 95 | 88 |
| 5 | 95 | 83 |
| 6 | 96 | 77 |
| 7 | 98 | 51 |
| 8 | 96 | 70 |
| 9 | 95 | 94 |
| 10 | 95 | 91 |
| Mean | 96 | 80 |

The validation results reveal that the deep learning model according to an embodiment of the present disclosure shows 96% average classification accuracy for trained exosomes, and 80% average classification accuracy for untrained exosome data.

Figure 7:
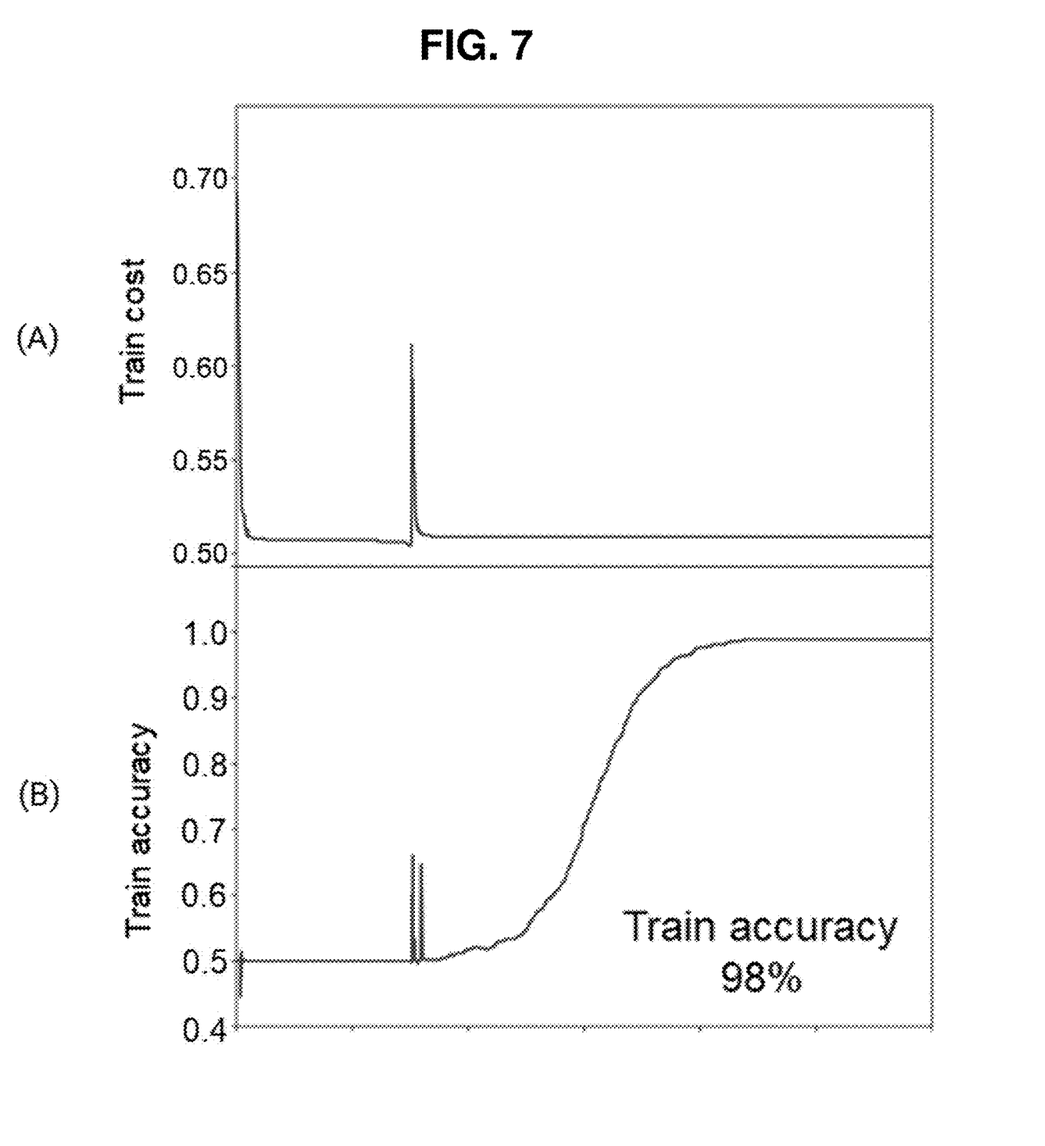
FIG. 7 is a diagram showing accuracy after data training according to an embodiment of the present disclosure.

FIG. 7 is a diagram showing accuracy after data training according to an embodiment of the present disclosure, showing 98% classification accuracy when all data is used in training.

Figure 8:
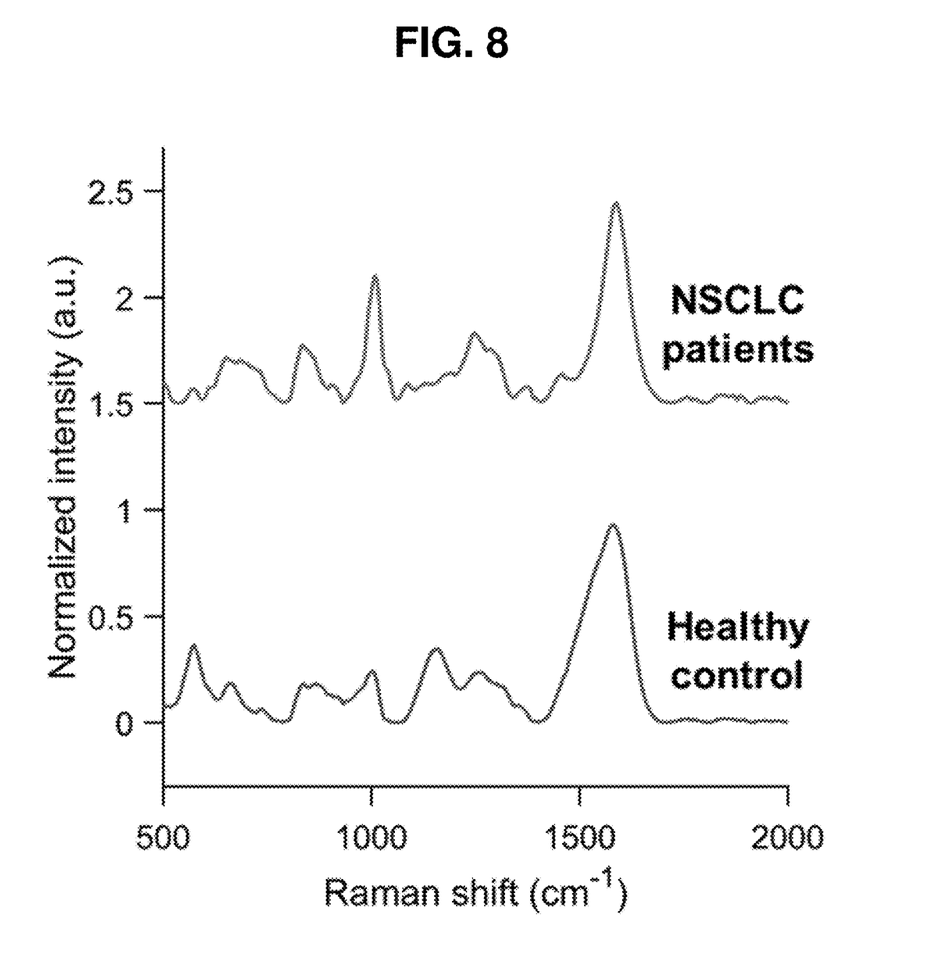
FIG. 8 is a diagram showing blood exosome Raman signals of a normal person and a lung cancer patient acquired according to an embodiment of the present disclosure.

FIG. 8 is a diagram showing blood exosome Raman signals of normal persons and lung cancer patients acquired according to an embodiment of the present disclosure, showing the mean of exosome SERS signal data acquired from 24 normal persons (healthy control) and 18 lung cancer patients (NSCLS patients).

The similarity to cultured cell exosome data may be analyzed by analysis through the deep learning model for each individual data as described above.

Figure 9:
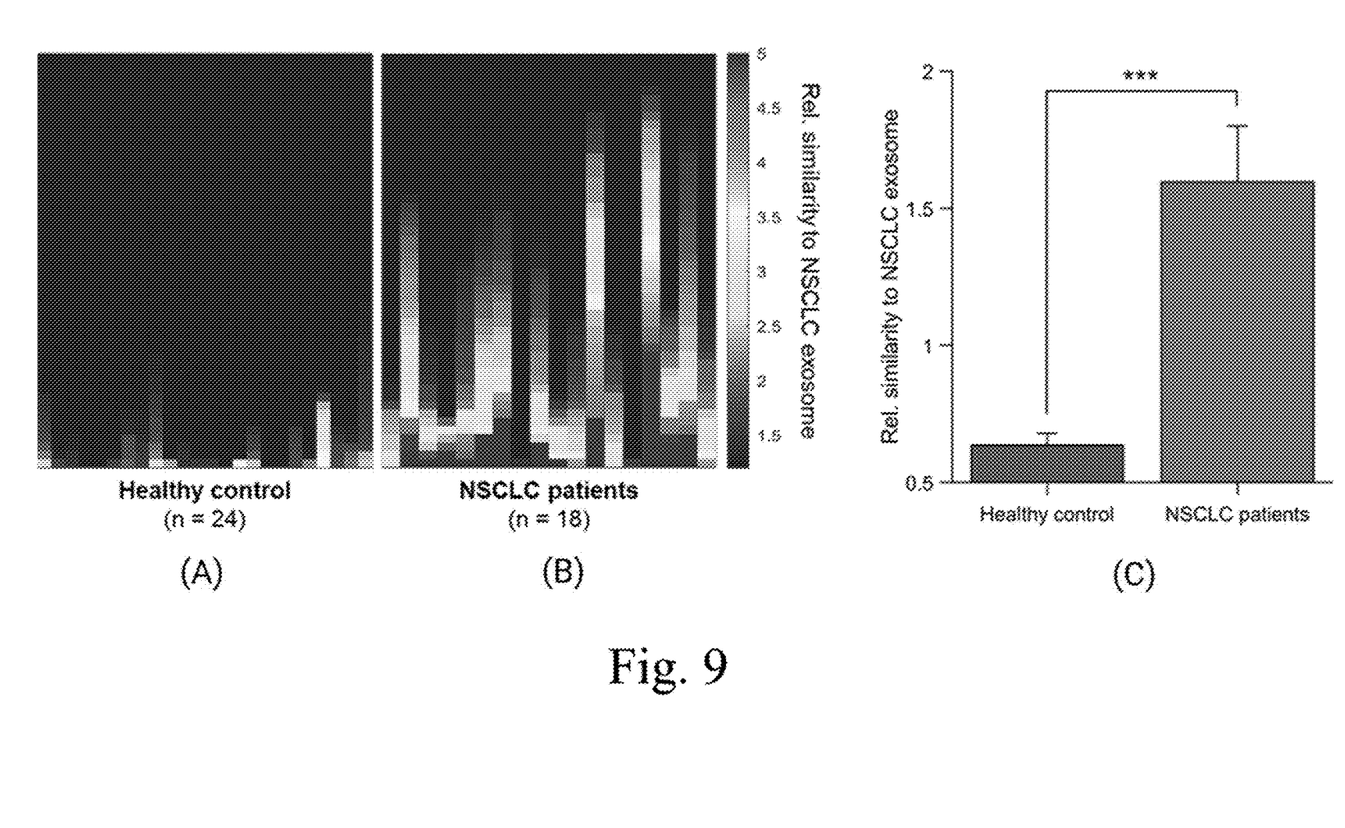
FIG. 9 is a diagram showing a result of analyzing blood exosome Raman signals of a normal person and a lung cancer patient according to an embodiment of the present disclosure.

FIG. 9 is a diagram showing a result of analyzing the blood exosome Raman signals of normal persons and lung cancer patients according to an embodiment of the present disclosure.

(A) and (B) of FIG. 9 show a heatmap displaying the analysis results of 50 exosome data for each person of 24 normal persons and 18 lung cancer patients respectively, showing the closer to red, the higher the relative similarity to lung cancer cell exosomes.

Referring to (A) and (B) of FIG. 9, since large quantities of exosomes derived from normal cells are present in the lung cancer patient's blood, a majority of exosome data is found different from lung cancer cell exosomes, but compared to the normal persons, lung cancer patient exosome data shows that a higher percentage of exosomes is similar to lung cancer cell exosomes.

(C) of FIG. 9 statistically shows the mean of 50 exosome data acquired from one person. A higher similarity to lung cancer cell exosomes is found in lung cancer patients than normal persons, and a p-value is 0.000036, and thus it can be seen that a statistical difference is very significant.

Figure 10:
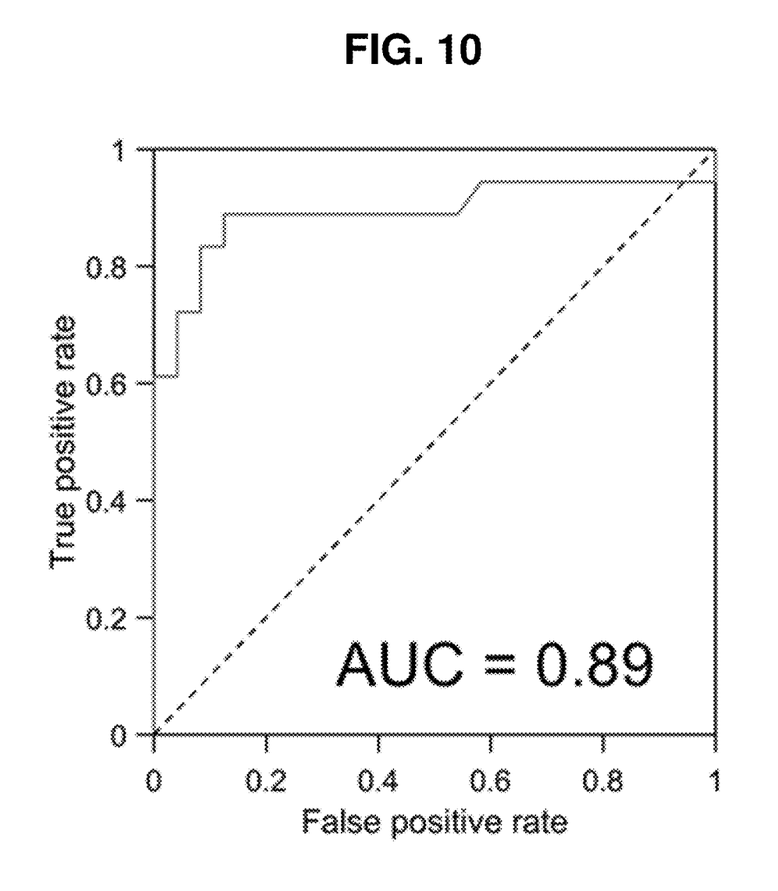
FIG. 10 is a diagram showing a receiver operating characteristic (ROC) curve for a method for providing cancer diagnosis information using artificial intelligence-based liquid biopsy of exosome according to an embodiment of the present disclosure.

FIG. 10 is a diagram showing a receiver operating characteristic (ROC) curve for a method for providing cancer diagnosis information using artificial intelligence-based liquid biopsy of exosome according to an embodiment of the present disclosure.

The ROC curve is shown to validate the effect of the deep learning model according to the above-described embodiment of the present disclosure. As the area under the ROC curve, i.e., area under curve (AUC) is closer to 1, utility is higher, and the deep learning model according to an embodiment of the present disclosure shows a value of 0.89.

The following Table 2 shows AUC value comparison results of the deep learning model according to an embodiment of the present disclosure and other research findings.

TABLE 2

| Author | Method | AUC |
|---|---|---|
| A. Hulbert, et. Al. | PCR based DNA methylation detection | 0.77-0.89 |
| M. Aslam, et. Al. | RCR based ctDNA detection | 0.81 |
| Y. Ni, et. Al. | ELISA based apelin detection | 0.81 |
| W. Wang, et. Al. | Circulating miRNA detection | 0.71-0.87 |
| Present disclosure | — | 0.89 |

Referring to Table 2, according to an embodiment of the present disclosure, it can be seen that it has the top utility among liquid biopsy based lung cancer diagnosis methods. As a result, according to an embodiment of the present disclosure, it is possible to diagnose with a very high level of accuracy.

Figure 11:
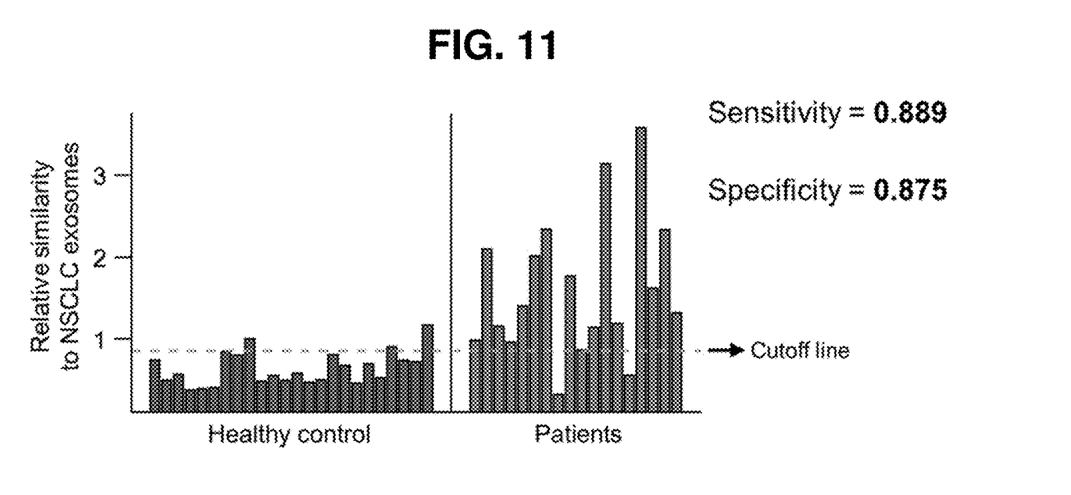
FIG. 11 is a diagram showing sensitivity and specificity by a method for providing cancer diagnosis information using artificial intelligence-based liquid biopsy of exosome according to an embodiment of the present disclosure.

FIG. 11 is a diagram showing sensitivity and specificity by the method for providing cancer diagnosis information using artificial intelligence-based liquid biopsy of exosome according to an embodiment of the present disclosure.

When a diagnostic cutoff point (cutoff line) is set to 0.85 based on the value derived from the ROC curve, sensitivity and specificity are about 89% and 88% respectively. That is, it can be seen that it is possible to clearly distinguish normal persons and lung cancer patients according to an embodiment of the present disclosure.

Figure 12:
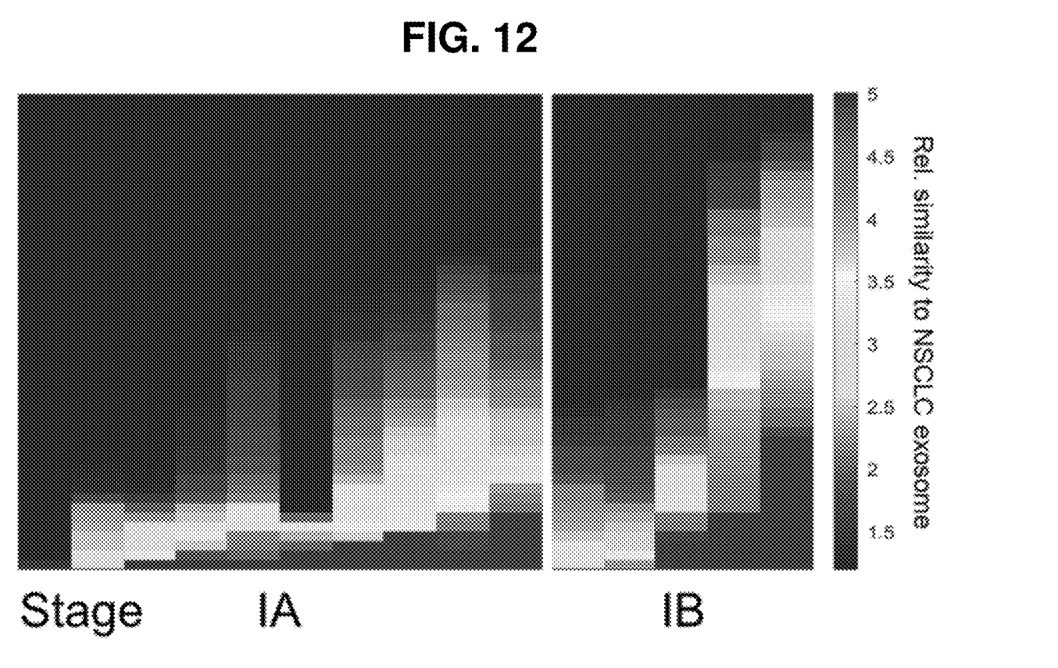
FIG. 12 is a diagram showing a result of staging lung cancer using a method for providing cancer diagnosis information using artificial intelligence-based liquid biopsy of exosome according to an embodiment of the present disclosure.

FIG. 12 is a diagram showing a result of staging lung cancer using the method for providing cancer diagnosis information using artificial intelligence-based liquid biopsy of exosome according to an embodiment of the present disclosure, and in the graph, the stage is higher as it goes rightward.

Referring to FIG. 12, it can be seen that as the cancer stage is higher, the similarity to cancer cell exosomes is higher, and from this, it can be seen that the above-described embodiment of the present disclosure may be used to stage cancers. For example, it may be used in a manner of setting a similarity reference value by grade for each cancer stage and providing cancer stage information according to a range corresponding to the similarity derived by the process described above with reference to FIG. 1.

Figure 13:
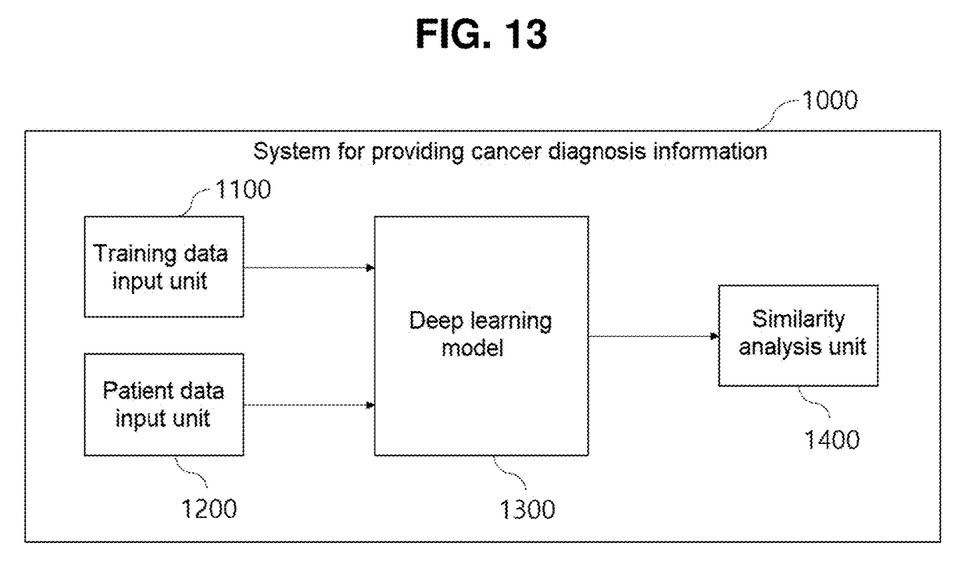
FIG. 13 is a block diagram of a system for providing cancer diagnosis information using artificial intelligence-based liquid biopsy of exosome according to another embodiment of the present disclosure.

FIG. 13 is a block diagram of a system for providing cancer diagnosis information using artificial intelligence-based liquid biopsy of exosome according to another embodiment of the present disclosure.

Referring to FIG. 13, the system 1000 for providing cancer diagnosis information using artificial intelligence-based liquid biopsy of exosome according to another embodiment of the present disclosure may include a training data input unit 1100, a patient data input unit 1200, a deep learning model 1300 and a similarity analysis unit 1400.

The training data input unit 1100 may receive input of exosome SERS signal data used to train the deep learning model 1300.

According to an embodiment, the training data input unit 1100 may receive input of SERS signals of exosomes derived from each of cultured cells, i.e., normal cells and cancer cells.

The patient data input unit 1200 may receive input of blood exosome SERS signals of a patient for providing cancer diagnosis information.

The deep learning model 1300 may first perform learning using the normal cell and cancer cell exosome SERS signals inputted through the training data input unit 1100.

Additionally, after the deep learning model 1300 is trained through the cultured cell exosome SERS signals, the deep learning model 1300 may analyze the blood exosome SERS signals inputted through the patient data input unit 1200.

The similarity analysis unit 1400 may analyze a similarity between the blood exosome data and cultured cell exosome data analyzed through the deep learning model 1300.

Here, the detailed configuration and/or operation method of each of the above-described elements is the same as the above description, and its repetitive description is omitted herein.

The system for providing cancer diagnosis information shown in FIG. 13 may be implemented in a computing device capable of deep learning computation.

The present disclosure is not limited to the above-described embodiments and the accompanying drawings. It is obvious to those having ordinary skill in the technical field pertaining to the present disclosure that substitution, modification and change may be made to the elements according to the present disclosure without departing from the technical spirit of the present disclosure.

The invention claimed is:

1. A process-implemented method for providing cancer diagnosis information using artificial intelligence-based liquid biopsy of exosome, the method comprising:
   measuring, by a Surface Enhanced Raman Spectroscopy (SERS) measurement device, a cultured cell exosome SERS signal from cultured cancer cells and cultured normal cells;
   training, by a processor, a deep learning model using the cultured cell exosome SERS signal, the deep learning model being configured to distinguish between cancer cell exosome signals and normal cell exosome signals, wherein the deep learning model comprises five convolution layers, including:
      a first convolutional layer configured to receive input data;
      a second to fifth convolutional layer, each comprising a plurality of sub-convolutional layers, wherein skip connections are inserted between every two of the sub-convolutional layers; and
      a fully connected layer connected sequentially after the fifth convolutional layer;
   measuring, by the SERS measurement device, a blood exosome SERS signal from a subject's blood sample;
   analyzing, by the processor, the blood exosome SERS signal using the deep learning model trained with the cultured cell exosome SERS signal to generate feature data, wherein the analyzing comprises processing the blood exosome SERS signal through the five convolutional layers and a first fully connected layer; and
   analyzing, by the processor, a similarity between blood exosome feature data and cultured cell exosome feature data analyzed using the deep learning model to generate cancer diagnosis information,
   wherein the similarity analysis comprises calculating a Mahalanobis distance, where $D_{normal}$ is a Mahalanobis distance from the blood exosome data to normal cell exosome data, and $D_{cancer}$ is a Mahalanobis distance from the blood exosome data to cancer cell exosome data.

2. The method of claim 1,
   wherein the cultured cell exosome comprises normal cell-derived exosome and cancer cell-derived exosome, and
   wherein SERS signals include a normal cell exosome SERS signal and a cancer cell exosome SERS signal, each obtained by the SERS measurement device from exosomes derived from cultured normal cells and cultured cancer cells, respectively.

3. The method of claim 1,
   wherein the fully connected layer includes:
   a first fully connected layer configured to output 4096 feature values, and
   a second fully connected layer configured to output 10 feature values based on the output of the first fully connected layer.

4. The method of claim 3,
   wherein analyzing the similarity comprises comparing, by the processor, the 10 feature values output from the second fully connected layer based on the subject's blood exosome SERS signal with the corresponding values derived from the cultured cancer cell exosome SERS signal.

5. The method of claim 4,
   wherein analyzing the similarity further comprises:
   determining, by the processor, a relative similarity to cancer cell exosome data according to the following equation:

Relative similarity to cancer exosome= $D_{normal}/D_{cancer}$ where the $D_{normal}$ is a Mahalanobis distance from the blood exosome data to the normal cell exosome data, and $D_{cancer}$ is a Mahalanobis distance from the blood exosome data to the cancer cell exosome data.

6. A system implemented in a computing device comprising at least one processor capable of deep learning computation for providing cancer diagnosis information using artificial intelligence-based liquid biopsy of exosome, the at least one processor being configured to execute instructions stored in a non-transitory computer medium, thereby configuring the processor to:
   measure a cultured cell exosome Surface Enhanced Raman Spectroscopy (SERS) signal from cultured cancer cells and cultured normal cells using a SERS measurement device;
   train a deep learning model using the cultured cell exosome SERS signal, the deep learning model being configured to distinguish between cancer cell exosome signals and normal cell exosome signals, wherein the deep learning model comprises five convolution layers, including:
      a first convolutional layer configured to receive input data;
      a second to fifth convolutional layer, each comprising a plurality of sub-convolutional layers, wherein skip connections are inserted between every two of the sub-convolutional layers; and
      a fully connected layer connected sequentially after the fifth convolutional layer;
   measure a blood exosome SERS signal from a subject's blood sample using the SERS measurement device;
   analyze the blood exosome SERS signal using the deep learning model trained with the cultured cell exosome SERS signal to generate feature data, wherein the analyzing comprises processing the blood exosome SERS signal through the five convolutional layers and a first fully connected layer: and analyze a similarity between blood exosome feature data and cultured cell exosome feature data analyzed using the deep learning model to generate cancer diagnosis information, wherein the similarity analysis comprises calculating a Mahalanobis distance, where $D_{normal}$ is a Mahalanobis distance from the blood exosome data to normal cell exosome data, and $D_{cancer}$ is a Mahalanobis distance from the blood exosome data to cancer cell exosome data.

* * * * *